I. SERRURIER.
FILM REWINDING DEVICE.
APPLICATION FILED AUG. 14, 1919.
1,369,197.   Patented Feb. 22, 1921.
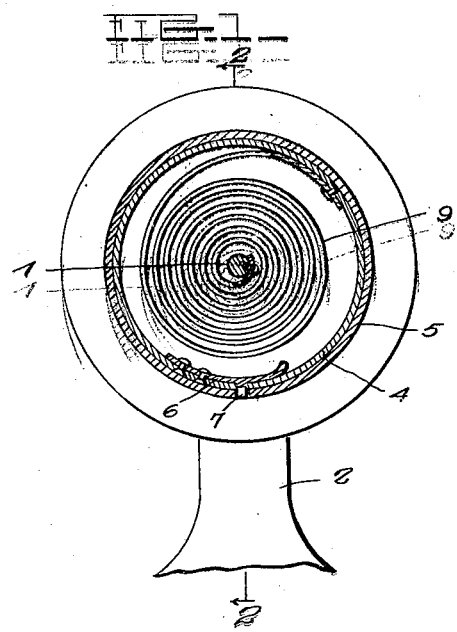
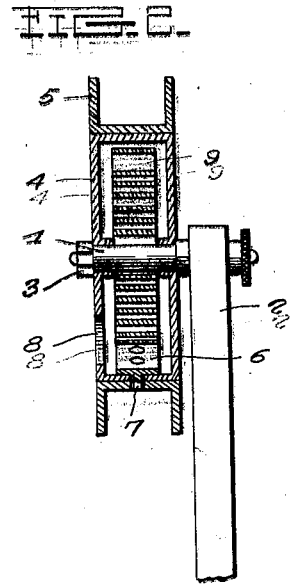
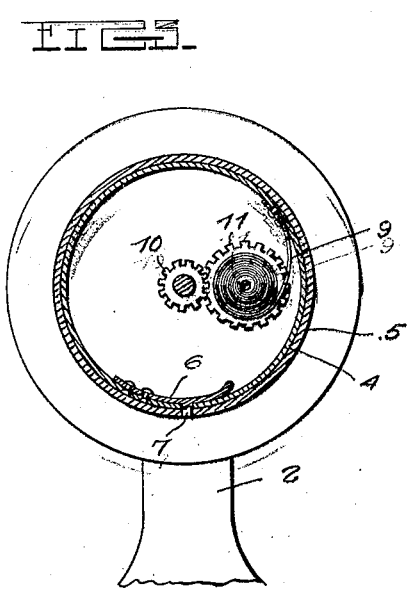
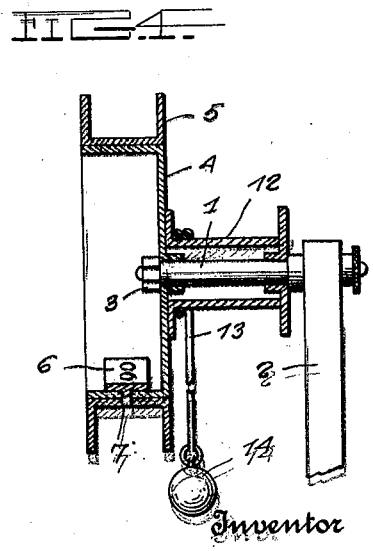
Witness
George W. Giovanyetti
Inventor
I. Serrurier
By
Attorneys

UNITED STATES PATENT OFFICE.

IWAN SERRURIER, OF ALTADENA, CALIFORNIA.

FILM-REWINDING DEVICE.

1,369,197.  Specification of Letters Patent.  Patented Feb. 22, 1921.

Application filed August 14, 1919. Serial No. 317,546.

*To all whom it may concern:*

Be it known that I, IWAN SERRURIER, a citizen of the United States, residing at Altadena, in the county of Los Angeles and State of California, have invented certain new and useful Improvements in Film-Rewinding Devices; and I do declare the following to be a full, clear, and exact description of the invention, such as will enable others skilled in the art to which it appertains to make and use the same.

This invention relates generally to film handling devices, but more particularly to film rewinding devices.

The principal object of the invention is to provide a means for handling motion picture films so that they can be easily shown and exchanged and neatly kept, the device being capable of attachment to a motion picture projector and consisting of a film reel support which will automatically rewind a short length of film after the same has been unwound from the reel for the purpose of displaying it.

Another object of the invention is to provide a device of this character which will be extremely simple, strong, durable and inexpensive in construction, one which will be efficient and reliable in operation, and well adapted to the purpose for which it is designed.

With these and other objects in view, invention consists of certain novel features of construction, and the combination and arrangement of parts as will be hereinafter fully described and claimed.

In the accompanying drawings in which similar reference characters designate corresponding parts throughout the several views, Figure 1 is a vertical sectional view of a device constructed in accordance with this invention, said view being taken on a plane disposed between the sides of the film reel;

Fig. 2 is a sectional view taken on the plane indicated by the line 2—2 of Fig. 1;

Fig. 3 is a view similar to Fig. 1 showing a modified form of the device; and,

Fig. 4 is a view similar to Fig. 2 showing a further modification.

Referring more particularly to the drawings and especially to Figs. 1 and 2, the numeral 1 designates a stationary spindle which is secured in any suitable manner to a convenient support or standard 2. The support or standard 2 and the spindle 1 may be a part of a motion picture projecting apparatus, or these elements may be a part of a device used merely for the purpose of displaying or holding reels containing motion picture films.

Rotatably mounted upon the spindle 1 and retained thereon by a nut 3 which is threaded to the free end of the same is a hollow drum. This drum 4 is adapted to receive a film reel 5 thereon, the reel being locked to the drum by means of a spring catch 6 disposed on the inside of the latter and having a pin 7 extending through an opening in the peripheral portion of the drum and into an opening formed in the adjacent portion of the reel 5. Access to the catch 6 is obtained through an opening 8 arranged in one of the side walls of the drum 4. Drum 4 is thus a film reel support. Secured at one end to the spindle 1 and coiled around the same is a torsional spiral spring 9, the other end of which is fastened to the drum 4. The spring 9 is normally in unwound position and when the film disposed upon the reel 5 is unwound, the drum 4 will be rotated in the proper direction so as to wind the spring. When released, the spring will rotate the drum in the reverse direction and rewind upon the reel.

In Fig. 3 of the drawings the spindle 1 is shown having a pinion 10 fixed thereto, and the drum 4 carries a rotatable gear 11 meshing with the pinion. The torsional spring 9 is in this case secured at one of its ends to the drum 4 and at its other end to the gear 11 so that when the drum is rotated in the proper direction to unwind the film from the reel 5 the gear 11 will have a planetary movement around the pinion 10 and this will cause the spring 9 to be wound up, but inasmuch as the gear 11 is considerably larger than the pinion 10, it will take considerable time for the spring to be completely wound. When the parts are released, the spring 9 exerting its pressure upon the gear 11 will rotate the same so as to move around the pinion 10 in a reverse direction and consequently cause the drum 4 to rotate in the reverse direction, thereby rewinding the film upon the reel.

In Fig. 4 of the drawings the drum 4 carries a spool 12 on its rear side, and secured to this spool at one end is a flexible element 13 having a weight 14 fastened to its other end. When the parts are in their normal position, the flexible element 13 is unwound from the spool 12 so that when the film is unwound from the reel 5 the flexible element will be wound upon the spool. When released the weight 14 acting upon the flexible element 13 will draw the same downwardly and rotate the spool and the parts carried thereby in the reverse direction so as to rewind the film upon the reel.

From the foregoing description, taken in connection with the accompanying drawings, the construction, use and operation of the invention will be readily understood without a more extended explanation.

Various changes in form, proportion, and in the minor details of construction may be resorted to without departing from the spirit of the invention as defined in the claims.

What is claimed is:—

1. A device of the class described comprising a stationary spindle, a hollow drum rotatably mounted upon said spindle and adapted to receive and carry a reel thereon, the peripheral portion of said drum being provided with an aperture, a leaf spring secured at one end to the inner side of the peripheral portion of said drum and provided at its other end with an outwardly projecting pin extending through said aperture to position it for locking engagement with the reel, and means for rotating said drum in one direction, said means being placed in operative position by the rotation of said drum in the opposite direction.

2. A device of the class described comprising a stationary spindle, a hollow drum rotatably mounted upon said spindle and adapted to receive and carry a reel thereon, a pinion fixed upon said spindle and being stationary therewith, a gear revolubly mounted eccentrically upon said drum and meshing with said pinion to revolve in a planetary manner around said pinion as said drum revolves, and a flat spiral spring having its inner end fastened to said gear and its outer end fastened to said drum, said pinion, gear and spring being disposed within said drum.

In testimony whereof I have hereunto set my hand.

IWAN SERRURIER.